United States Patent
Hopkins et al.

(10) Patent No.: US 10,789,797 B2
(45) Date of Patent: Sep. 29, 2020

(54) PERIPHERAL CONTROLLER IN AN ACCESS CONTROL SYSTEM

(71) Applicant: Schlage Lock Company LLC, Carmel, IN (US)

(72) Inventors: Benjamin Hopkins, Zionsville, IN (US); David Studt, Noblesville, IN (US); Joseph W. Baumgarte, Carmel, IN (US); Ryan C. Kincaid, Indianapolis, IN (US); Dan Pfunder, Noblesville, IN (US); Kevin P. Oehler, Fishers, IN (US); Ethan Harmon, Indianapolis, IN (US); Jonathan Everson, Kokomo, IN (US)

(73) Assignee: Schlage Lock Company LLC, Carmel, IN (US)

(*) Notice: Subject to any disclaimer, the term of this patent is extended or adjusted under 35 U.S.C. 154(b) by 0 days.

(21) Appl. No.: 16/140,180

(22) Filed: Sep. 24, 2018

(65) Prior Publication Data

US 2019/0096148 A1    Mar. 28, 2019

Related U.S. Application Data

(60) Provisional application No. 62/562,028, filed on Sep. 22, 2017.

(51) Int. Cl.
*G06K 5/00* (2006.01)
*G07C 9/28* (2020.01)
(Continued)

(52) U.S. Cl.
CPC .......... *G07C 9/28* (2020.01); *G07C 9/00174* (2013.01); *G07C 9/00182* (2013.01); *G07C 9/00571* (2013.01); *H04L 12/10* (2013.01); *H04L 12/40045* (2013.01); *G07C 2009/00634* (2013.01)

(58) Field of Classification Search
USPC ............................................... 235/382, 382.5
See application file for complete search history.

(56) References Cited

U.S. PATENT DOCUMENTS 6,720,861 B1    4/2004  Rodenbeck et al.
6,796,494 B1    9/2004  Gonzalo
(Continued)

OTHER PUBLICATIONS

Allegion, CT5000 Offline controller, Apr. 2016, 2 pages.
(Continued)

*Primary Examiner* — Tuyen K Vo
(74) *Attorney, Agent, or Firm* — Taft Stettinius & Hollister LLP

(57) ABSTRACT

A peripheral controller for an access control system according to one embodiment includes a reader interface, a Power over Ethernet circuit, a processor, and a memory. The reader interface is configured to be communicatively coupled to at least one credential reader. The Power over Ethernet (PoE) circuit is configured to receive power over an Ethernet cable for powering the peripheral controller. The memory includes a plurality of instructions stored thereon that, in response to execution by the processor, causes the peripheral controller to analyze credential data received via the reader interface make an access control decision based on the analyzed credential data.

20 Claims, 6 Drawing Sheets

(51) Int. Cl.
    *H04L 12/40*     (2006.01)
    *G07C 9/00*     (2020.01)
    *H04L 12/10*     (2006.01)

(56) References Cited

U.S. PATENT DOCUMENTS

| | | | |
|---|---|---|---|
| 6,952,165 | B2 | 10/2005 | Kovach et al. |
| 7,439,862 | B2 | 10/2008 | Quan |
| 7,498,936 | B2 | 3/2009 | Maeng |
| 7,741,969 | B2 * | 6/2010 | Linford .................. E05B 45/06 340/542 |
| 8,115,609 | B2 | 2/2012 | Ketari |
| 8,166,532 | B2 | 4/2012 | Chowdhury et al. |
| 8,264,322 | B2 | 9/2012 | Rodenbeck et al. |
| 8,322,610 | B2 | 12/2012 | Guthery |
| 8,665,064 | B1 | 3/2014 | Rodenbeck et al. |
| 2008/0094171 | A1 | 4/2008 | Sawhney |
| 2008/0218330 | A1 | 9/2008 | Biles et al. |
| 2012/0239945 | A1 * | 9/2012 | Balasubramanian ... H04L 12/10 713/300 |
| 2013/0293350 | A1 | 11/2013 | Hartmann |
| 2013/0342314 | A1 | 12/2013 | Chen et al. |
| 2014/0002236 | A1 * | 1/2014 | Pineau .................... G06F 21/32 340/5.6 |
| 2014/0247113 | A1 * | 9/2014 | Paquin ............... G07C 9/00007 340/5.65 |
| 2015/0012613 | A1 * | 1/2015 | Wang .................... H04W 36/26 709/217 |
| 2016/0005248 | A1 * | 1/2016 | Aase ....................... H04W 4/80 340/5.61 |
| 2016/0019736 | A1 * | 1/2016 | Radicella ........... G07C 9/00103 235/382 |
| 2016/0189452 | A1 | 6/2016 | Radicella et al. |
| 2016/0371910 | A1 * | 12/2016 | Baumgarte ........ G07C 9/00817 |
| 2017/0039410 | A1 * | 2/2017 | Pi .......................... G06F 1/1643 |
| 2017/0124792 | A1 * | 5/2017 | Schoenfelder ..... G07C 9/00571 |
| 2017/0301162 | A1 * | 10/2017 | Radicella ........... G07C 9/00103 |

OTHER PUBLICATIONS

Allegion, WRI400 Wireless Reader Interface, Aug. 2017, 2 pages.
International Search Report; International Searching Authority; International Patent Application No. PCT/US2018/052458; dated Jan. 15, 2019; 2 pages.
Written Opinion; International Searching Authority; International Patent Application No. PCT/US2018/052458; dated Jan. 15, 2019; 5 pages.

\* cited by examiner

PERIPHERAL CONTROLLER IN AN ACCESS CONTROL SYSTEM

CROSS-REFERENCE TO RELATED APPLICATIONS

This application claims the benefit of U.S. Provisional Application No. 62/562,028 filed on Sep. 22, 2017, the contents of which are incorporated herein by reference in their entirety.

BACKGROUND

Access control systems typically involve the use of credentials to manage the operation of an access control device (e.g., a lock device). Such credentials may be assigned to a particular user or device and are often physical in nature, forming at least a portion of, for example, a smartcard, proximity card, key fob, token device, or mobile device. Thus, current credential systems generally require an interaction between the credential and a reader device (e.g., on or coupled to the lock device) such that the reader device may read the credential, and the access control system may thereby make an access control decision (e.g., whether to grant access to the user bearing the credential). Depending on the particular implementation, the access control decision may be made "at the door" by the reader itself or another access control device communicatively coupled thereto, or the access control decision may be made "at the host" by a host or management server remote from the door.

SUMMARY

According to one embodiment, a peripheral controller for an access control system may include a reader interface configured to be communicatively coupled to at least one credential reader, a Power over Ethernet (PoE) circuit configured to receive power over an Ethernet cable for powering the peripheral controller, a processor, and a memory comprising a plurality of instructions stored thereon that, in response to execution by the processor, causes the peripheral controller to analyze credential data received via the reader interface and make an access control decision based on the analyzed credential data.

In some embodiments, the plurality of instructions may further cause the peripheral controller to transmit a control signal associated with unlocking a lock mechanism that secures a barrier.

In some embodiments, the peripheral controller may further include an output relay electrically coupled to a lock mechanism, wherein to transmit the control signal comprises to transmit a control signal to the output relay, and wherein the output relay transmits a corresponding signal to the lock mechanism to cause the lock mechanism to unlock.

In some embodiments, the lock mechanism may include an electrical door strike.

In some embodiments, the peripheral controller may include a line power interface configured to receive line power from an external power supply and an Ethernet interface configured to receive Ethernet data communication and Power-over-Ethernet (PoE) from a remote device.

In some embodiments, the Ethernet interface may support PoE IEEE 802.3af and PoE+ IEEE 802.3at.

In some embodiments, the peripheral controller may include communication circuitry configured to facilitate communication with a management server via at least one of a Bluetooth connection, a Wi-Fi connection, or an Ethernet connection, and the plurality of instructions may further cause the peripheral controller to communicate with the management server via the communication circuitry to exchange at least one of a firmware update, audit data, access control database data, or an access control schedule.

In some embodiments, the reader interface may support communication with each of the at least one credential reader via one of an RS-485 interface and a Wiegand interface and control lines at a given time.

In some embodiments, the peripheral controller may include a hardware selector to select between the RS-485 interface and the Wiegand interface.

In some embodiments, the peripheral controller may include wireless communication circuitry configured to facilitate communication with a mobile device via a Bluetooth connection and a Wi-Fi connection, and the plurality of instructions may further cause the peripheral controller to communicate with the mobile device via one of the Bluetooth connection or the Wi-Fi connection selected based on a file size of data to be exchanged between the peripheral controller and the mobile device.

In some embodiments, the peripheral controller may include a plurality of inputs including a request to exit (REX) input, a request to enter (REN) input, a remote release (REL) input and a door position switch (DPS) input electrically coupled to corresponding input components.

In some embodiments, the peripheral controller may include a plurality of switches, and each input of the plurality of inputs may be configurable as normally open or normally closed based on a corresponding switch of the plurality of switches.

In some embodiments, the peripheral controller may include a plurality of output relays, a plurality of output status LEDs, wherein each output status LED of the plurality of output status LEDs corresponds with an output relay of the plurality of output relays and is configured to indicate a status the corresponding output relay, and a plurality of test buttons, wherein each test button of the plurality of test buttons corresponds with an output relay of the plurality of output relays and is configured to directly test the corresponding output relay, and wherein the output status LED of a corresponding output relay may be changed by activation of the test button associated with corresponding output relay.

In some embodiments, the plurality of test buttons may include a lock test button, an alarm test button, and an auxiliary test button.

According to another embodiment, an access control system may include a credential reader configured to receive access credentials via a wireless communication connection with a credential device, an electronic lock including a lock mechanism configured to control access through a barrier, and a peripheral controller separate from the electronic lock and comprising a reader interface communicatively coupled to the credential reader and a Power over Ethernet (PoE) circuit that receives power over an Ethernet cable for powering the peripheral controller, wherein the peripheral controller is configured to analyze credential data received from the credential device via the reader interface, make an access control decision based on the analyzed credential data to determine whether to grant access to a user of the credential device, and transmit a control signal to the electronic lock to unlock the lock mechanism in response to a determination to grant access to the user.

In some embodiments, the peripheral controller may further include an output relay electrically coupled to the lock mechanism, wherein to transmit the control signal to the electronic lock may include to transmit the control signal to the output relay and to transmit a corresponding signal to the lock mechanism to cause the lock mechanism to unlock.

In some embodiments, the lock mechanism may include an electrical door strike.

In some embodiments, the peripheral controller further comprises a line power interface configured to receive line power from an external power supply and an Ethernet interface configured to receive Ethernet data communication and Power-over-Ethernet (PoE) from a remote device.

In some embodiments, the access control system may further include a management server configured to communicate with the peripheral controller via at least one of a Bluetooth connection, a Wi-Fi connection, or an Ethernet connection to exchange at least one of a firmware update, audit data, access control database data, or an access control schedule In some embodiments, the access control system may further include a mobile device configured to communicate with the peripheral controller via a Bluetooth connection and a Wi-Fi connection, and the Bluetooth connection or the Wi-Fi connection may be selected based on a file size of data to be exchanged between the peripheral controller and the mobile device.

Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
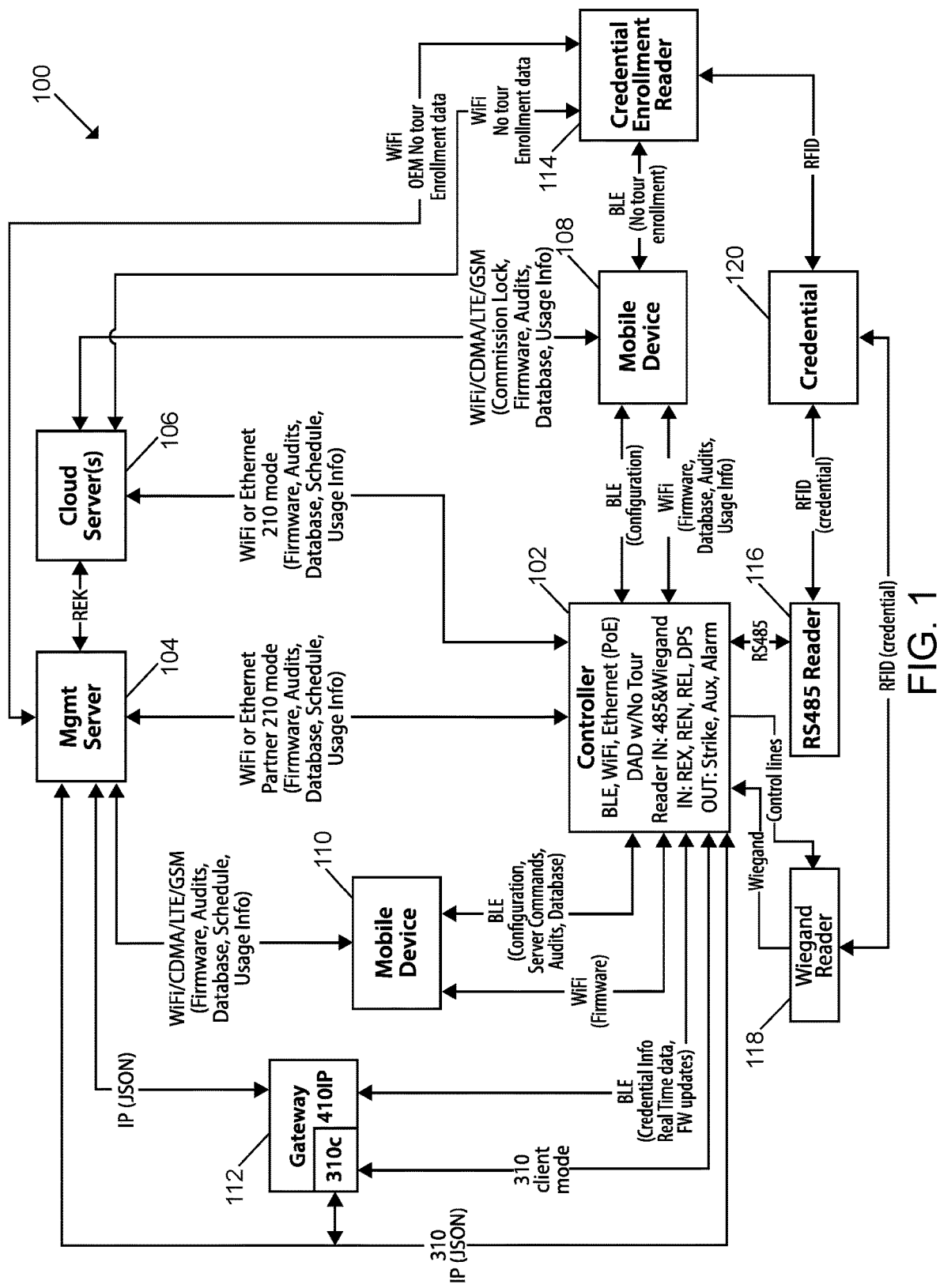
FIG. 1 is a simplified block diagram of at least one embodiment of an access control system.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

The terms longitudinal, lateral, and transverse may be used to denote motion or spacing along three mutually perpendicular axes, wherein each of the axes defines two opposite directions. The directions defined by each axis may also be referred to as positive and negative directions. Additionally, the descriptions that follow may refer to the directions defined by the axes with specific reference to the orientations illustrated in the figures. For example, the directions may be referred to as distal/proximal, left/right, and/or up/down. It should be appreciated that such terms may be used simply for ease and convenience of description and, therefore, used without limiting the orientation of the system with respect to the environment unless stated expressly to the contrary. For example, descriptions that reference a longitudinal direction may be equally applicable to a vertical direction, a horizontal direction, or an off-axis orientation with respect to the environment. Furthermore, motion or spacing along a direction defined by one of the axes need not preclude motion or spacing along a direction defined by another of the axes. For example, elements described as being "laterally offset" from one another may also be offset in the longitudinal and/or transverse directions, or may be aligned in the longitudinal and/or transverse directions. The terms are therefore not to be construed as further limiting the scope of the subject matter described herein.

Referring now to FIG. 1, the illustrative access control system 100 includes a peripheral controller 102, a management server 104, one or more cloud servers 106, a mobile device 108, a mobile device 110, a gateway device 112, a credential enrollment reader 114, an RS-485 reader 116, a Wiegand reader 118, and a credential 120.

It should be appreciated that the access control system 100 may control access to a passageway (e.g., through a doorway) to grant or deny user access through the passageway based on the credential 120 presented by the user. In particular, the peripheral controller 102 may be electrically and/or communicatively coupled to a credential reader 116, 118 and configured to make an access control decision based on credential data received from a credential presented by a user to the credential reader 116, 118 (e.g., based on an access control database that defines access permissions for various users/credentials). Further, the peripheral controller 102 may be electrically and/or communicatively coupled to an electronic lock, door strike, door latch, and/or other suitable lock mechanism configured to lock/unlock the corresponding passageway barrier (e.g., door/gate) such that the peripheral controller 102 may instruct or signal (e.g., via a relay) the lock mechanism to permit/deny access through the barrier based on the access control decision. It should be appreciated that the peripheral controller 102 is "peripheral" in the sense that it is not integrated with an electronic lock. That is, in the illustrative embodiment, the peripheral controller 102 is not mounted on the door/barrier.

The peripheral controller 102 may be configured to communicate with the management server 104, the cloud server(s) 106, the mobile device 108, the mobile device 110, the gateway device 112, the RS-485 reader 116, and/or the Wiegand reader 118 using various communication connections. In particular, in some embodiments, the peripheral controller 102 may communicate with the management server 104 and/or the cloud server(s) 106 over a Wi-Fi connection or via an Ethernet connection to exchange firmware updates, audits, an access control database or updates thereto, an access control schedule, usage information, and/or other suitable data. In some embodiments, the peripheral controller 102 may communicate with the mobile device 108 (e.g., via a mobile application) over a Bluetooth connection (e.g., BLE) and/or Wi-Fi connection. For example, the peripheral controller 102 may communicate with the mobile device 108 over a BLE connection to exchange data with a relatively small file size (e.g., configuration data) and over a Wi-Fi connection to exchange data with a relatively large file size (e.g., firmware updates, an access control database or updates thereto, audits, and/or usage information). Similarly, in some embodiments, the peripheral controller 102 may communicate with the mobile device 110 (e.g., via a mobile application of an OEM) over a Bluetooth connection (e.g., BLE) and/or Wi-Fi connection. For example, the peripheral controller 102 may communicate with the mobile device 110 over a Wi-Fi connection to exchange firmware data and/or over a BLE connection to exchange configuration data, server commands (e.g., from the management server 104), audits, and/or an access control database or updates thereto. In some embodiments, the peripheral controller 102 may communicate with the gateway device 112 over a Bluetooth (e.g., BLE) connection to exchange credential information, real-time data, and/or firmware updates. Further, the peripheral controller 102 may communicate with the gateway device 112 over an Ethernet connection between the peripheral controller 102 and the gateway device 112. Additionally, in some embodiments, the peripheral controller 102 may communicate directly with the management server 104 via IP (e.g., using JSON), thereby enabling a direct to host communication connection.

Further, it should be appreciated that the peripheral controller 102 may be communicatively coupled to one or more readers. More specifically, in some embodiments, the peripheral controller 102 may be communicatively coupled to an RS-485 reader 116 via an RS-485 link (e.g., a serial communication link) and/or a Wiegand reader 118 via corresponding Wiegand and control lines. Although the peripheral controller 102 is described herein as only being communicatively coupled to the readers 116, 118, it should be appreciated that the peripheral controller 102 may, additionally or alternatively, be structured and configured to be communicatively coupled to one or more other types of credential readers in other embodiments.

As described above, the management server 104 may be configured to communicate directly with the peripheral controller 102 (e.g., via a Wi-Fi or Ethernet connection). Further, in some embodiments, the management server 104 may be configured to communicate with the gateway device 112 (e.g., via IP using JSON) and with the mobile device 110 (e.g., via Wi-Fi, CDMA, LTE, and/or GSM) to exchange firmware/updates, audits, an access control database or updates thereto, an access control schedule, and or usage information. In other words, in such embodiments, the peripheral controller 102 may communicate with the management server 104 via the mobile device 110 and/or the gateway device 112. For example, the peripheral controller 102 may communicate with the gateway device 112 via a BLE or Ethernet connection, and the gateway device 112 may, in turn, forward the communicated data to the management server 104 via IP. Similarly, the management server 104 may communicate data to the gateway device 112 and/or mobile device 110, which is forwarded to the peripheral controller 102 via a suitable communication connection. As such, it should be appreciated that the peripheral controller 102 may communicate with the management server 104 via an online mode with a persistent real-time communication connection or via an offline mode (e.g., periodically or in response to an appropriate condition) depending on the particular embodiment. In some embodiments, the gateway device 112 may be embodied as a hot spot device/reader and/or plug-in device.

In some embodiments, the management server 104 may be configured to manage credentials of the access control system 100. For example, the management server 104 may be responsible for ensuring that the peripheral device 102 has updated authorized credentials, whitelists, blacklists, device parameters, and/or other suitable data. Similarly, in some embodiments, the management server 104 may be responsible for registering credentials with the access control system 100 and/or distributing appropriate credentials for authorized access through the passageway controlled by the peripheral controller 102. Additionally, as described herein, the management server 104 may receive security data, audit data, raw sensor data, and/or other suitable data from the peripheral controller 102 (e.g., directly or indirectly) for management of the access control system 100. In some embodiments, the management server 104 may be communicatively coupled with the cloud server(s) 106 and/or a cloud-based application. In other embodiments, the management server 104 may be embodied as an online server or a cloud-based server.

Further, in some embodiments, the management server 104 may communicate with multiple peripheral controllers 102 at a single site (e.g., a particular building) and/or across multiple sites. That is, in such embodiments, the management server 104 may be configured to receive data from peripheral controllers 102 distributed across a single building, multiple buildings on a single campus, or across multiple locations.

In some embodiments, the cloud server(s) 106 may be embodied as a cloud-based device or collection of devices within a cloud environment. In such embodiments, it should be appreciated that the server 106 may be embodied as a "serverless" or server-ambiguous computing solution, for example, that executes a plurality of instructions on-demand, contains logic to execute instructions only when prompted by a particular activity/trigger, and does not consume computing resources when not in use. That is, the server 106 may be embodied as a virtual computing environment residing "on" a computing system (e.g., a distributed network of devices) in which various virtual functions (e.g., Lamba functions, Azure functions, Google cloud functions, and/or other suitable virtual functions) may be executed corresponding with the functions of the server 106 described herein. For example, when an event occurs, the application may contact the virtual computing environment (e.g., via an HTTPS request to an API of the virtual computing environment), whereby the API may route the request to the correct virtual function (e.g., a particular server-ambiguous computing resource) based on a set of rules.

The credential enrollment reader 114 may be embodied as any credential enrollment reader configured to enroll credentials (e.g., no-tour credentials via RFID). For example, in some embodiments, the credential enrollment reader 114 may be embodied as a multi-technology enrollment reader such as the Schlage® (formerly aptiQ®) MT20W credential enrollment reader available from Allegion. In some embodiments, the credential 120 may be embodied as a MIFARE® Classic or MIFARE DESFire™ EV1 smart credential. It should be appreciated that the credential enrollment reader 114 may receive "no tour" credential enrollment data from the management server 104 directly or indirectly. For example, in some embodiments, the credential enrollment reader 114 may receive the credential enrollment data directly from the management server 104 via a Wi-Fi connection or indirectly from the cloud server(s) 106 via a Wi-Fi connection. In another embodiment, the credential enrollment reader 114 may receive the credential enrollment data from the mobile device 108 which, in turn, may have received the credential enrollment data from the cloud server(s) 106 or the management server 104. As such, it should be appreciated that the mobile device 108 may be configured to communicate with the cloud server(s) 106 via a Wi-Fi, CDMA, LTE, and/or GSM connection to exchange data for commissioning the peripheral controller 102 or an electronic lock, firmware and/or firmware updates, audits, an access control database or updates thereto, usage information, credential enrollment data, and/or other relevant data. Additionally, the mobile device 108 may be configured to communicate with the credential enrollment reader 114 via a Bluetooth connection (e.g., BLE) and/or NFC to exchange the credential enrollment data. In some embodiments, the RS-485 reader 116 and/or the Weigand reader 118 may be embodied as a Schlage® (formerly aptiQ®) MT11 multi-technology mullion reader or a Schlage® (formerly aptiQ®) MTK15 multi-technology single-gang keypad reader available from Allegion.

It should be appreciated that, in some embodiments, the credential enrollment reader 114 may store "no tour" credential enrollment data on the credential 120 such that the reader 116, 118 may read the credential enrollment data when the credential 120 is presented to the reader 116, 118 by the user. Further, the reader 116, 118 may forward the credential enrollment data to the peripheral controller 102, and the peripheral controller 102 may update the access control database stored thereon to permit access by the credential 120 through a passageway controlled by the peripheral controller 102. Further, in some embodiments, the peripheral controller 102 may simultaneously remove access permissions for another credential 120 based on the credential enrollment data. As such, upon subsequent presentation of the newly enrolled credential 120 to the reader 116, 118, the peripheral controller 102 will permit access; however, upon subsequent presentation of the other credential 120 (e.g., the old credential), the peripheral controller 102 will deny access. In some embodiments, the peripheral controller 102 may update a flag, field, bit, byte, or other data structure stored on the "no tour" credential 120 to indicate that the access control database has been updated. As such, in some embodiments, the peripheral controller 102 may first analyze that data structure of the "no tour" credential 120 to determine whether updating the access control database is required. If not, the peripheral controller 102 may treat the credential 120 as an ordinary credential and determine whether access is to be granted or denied.

Figure 2:
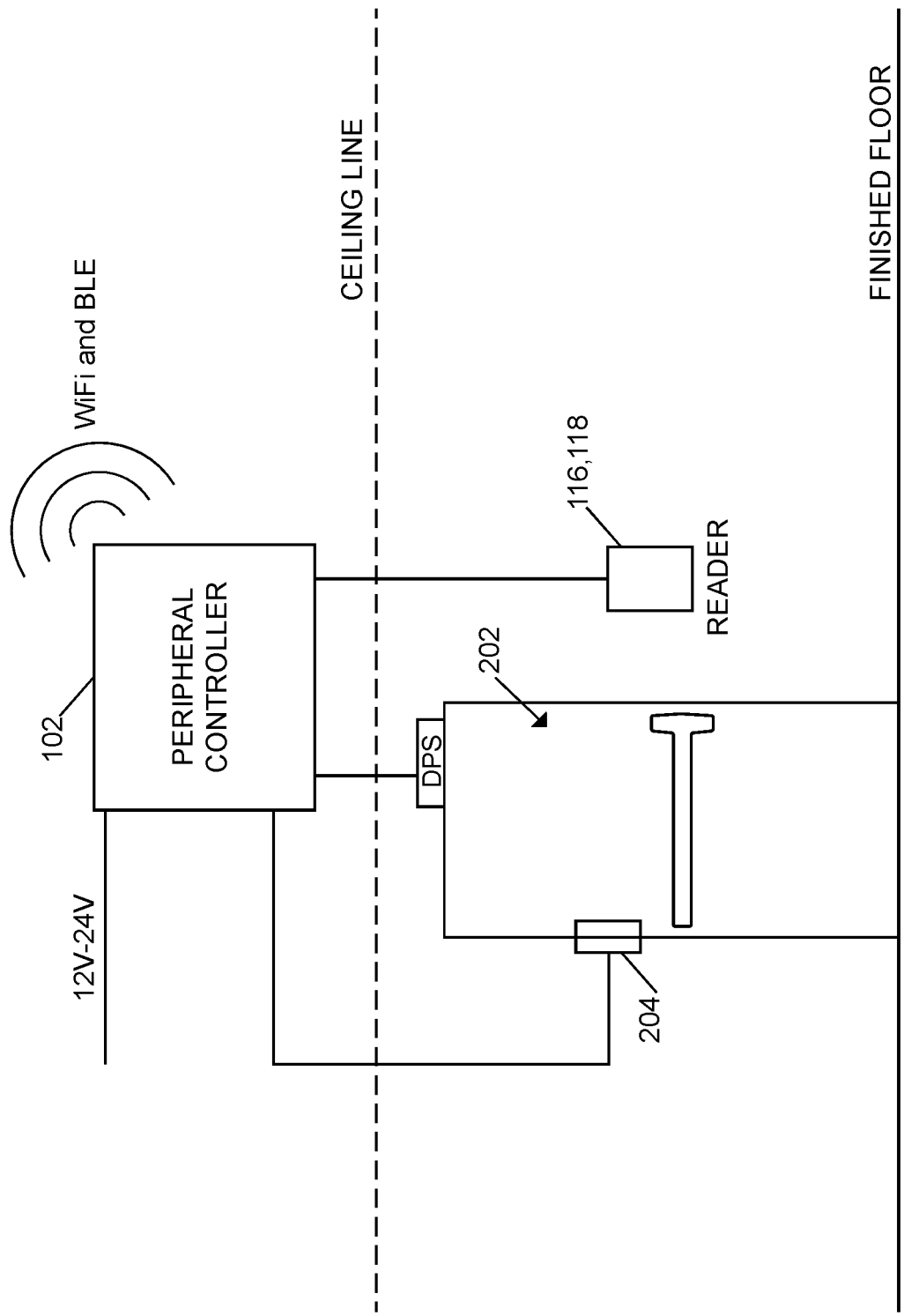
FIG. 2 illustrates at least one embodiment of an installation of the access control system of FIG. 1 in a building.

As shown in FIG. 2, in use, the peripheral controller 102 may be coupled to a reader 116, 118 to control access through a passageway selectively blocked by a barrier 202 (e.g., a door/gate). As shown and described in greater detail below, the peripheral controller 102 may be electrically coupled (e.g., via an output relay) to a door strike 204 or other lock mechanism that may be controlled to be in a locked state in which the access control device prevents access through the passageway defined by and blocked by the barrier 202 and an unlocked state in which the access control device permits access through the passageway. For example, in some embodiments, in response to determining to grant access, a processor of the peripheral controller 102 may transmit a signal to a corresponding output relay which, in turn, may be transmitted to the door strike 204 or other lock mechanism to unlock the corresponding lock mechanism. In some embodiments, the lock mechanism includes a deadbolt, latch bolt, lever, and/or other mechanism adapted to move between the locked and unlocked state and otherwise perform the functions described herein. However, it should be appreciated that the lock mechanism may be embodied as any another mechanism suitable for controlling access through a passageway in other embodiments.

It should be appreciated that the peripheral controller 102 may receive power (e.g., 12-24V) via line power or via Power over Ethernet (PoE). Further, the peripheral controller 102 may be electrically coupled to a door position sensor (DPS) and/or other sensors in some embodiments. As shown in FIG. 2, the peripheral controller 102 may be located remotely from the access control device (e.g., above the room ceiling) and may be configured to communicate with the other devices of the access control system 100, for example, via Wi-Fi and/or BLE as described above.

Figure 3:
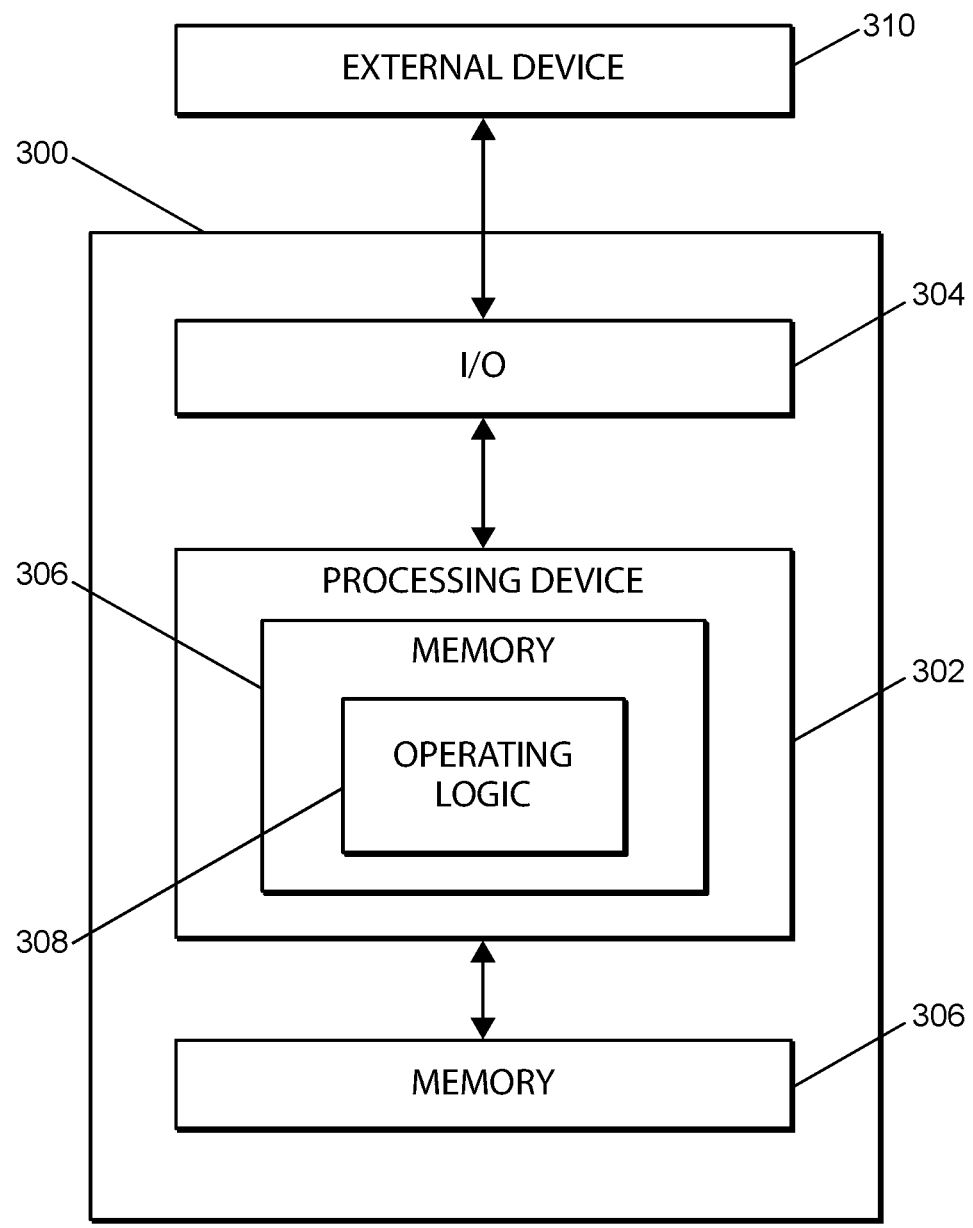
FIG. 3 is a simplified block diagram of at least one embodiment of a computing system.
Figure 4:
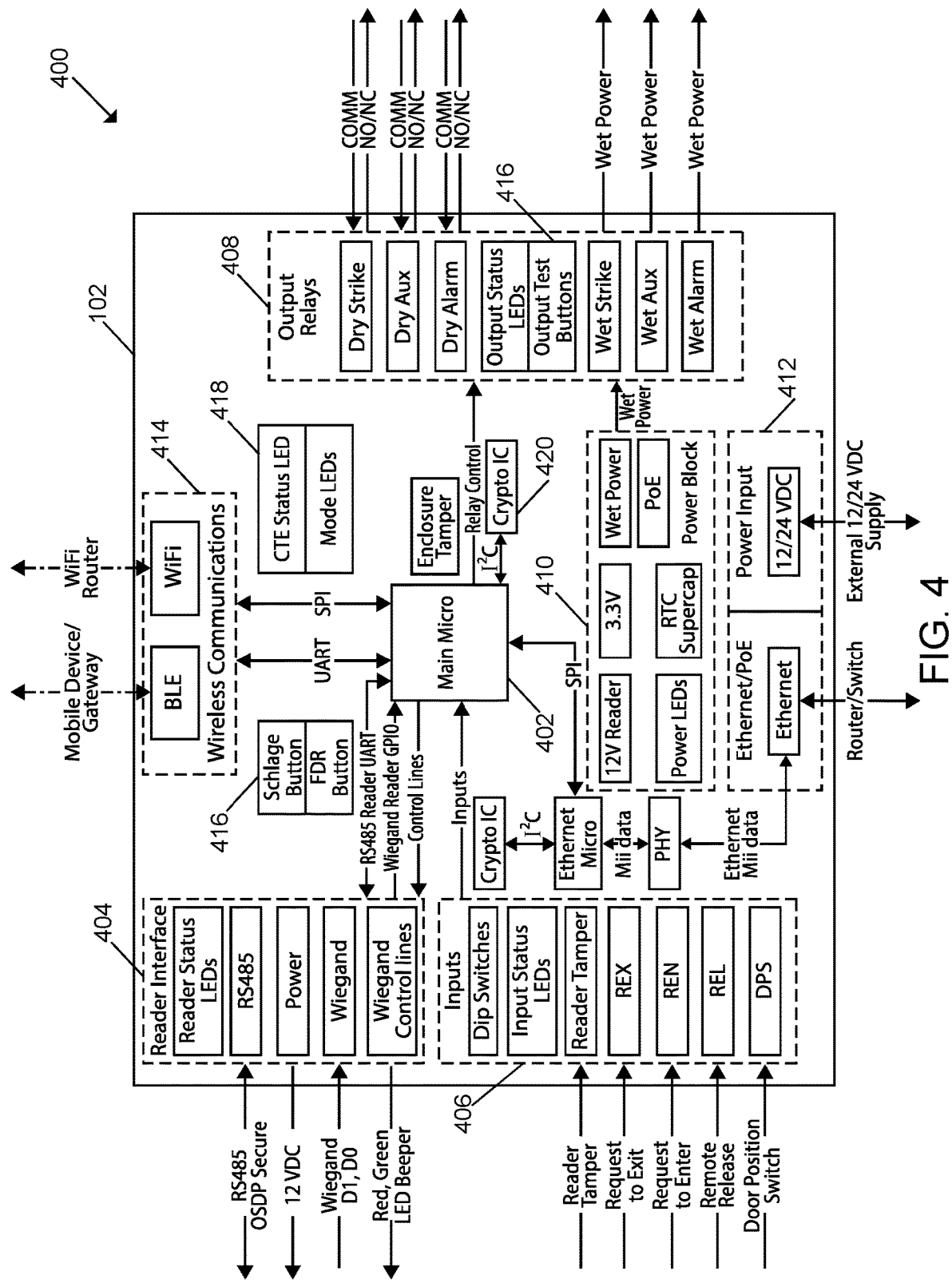
FIG. 4 is a simplified block diagram of at least one embodiment of a hardware architecture of the peripheral controller of FIG. 1.
Figure 5:
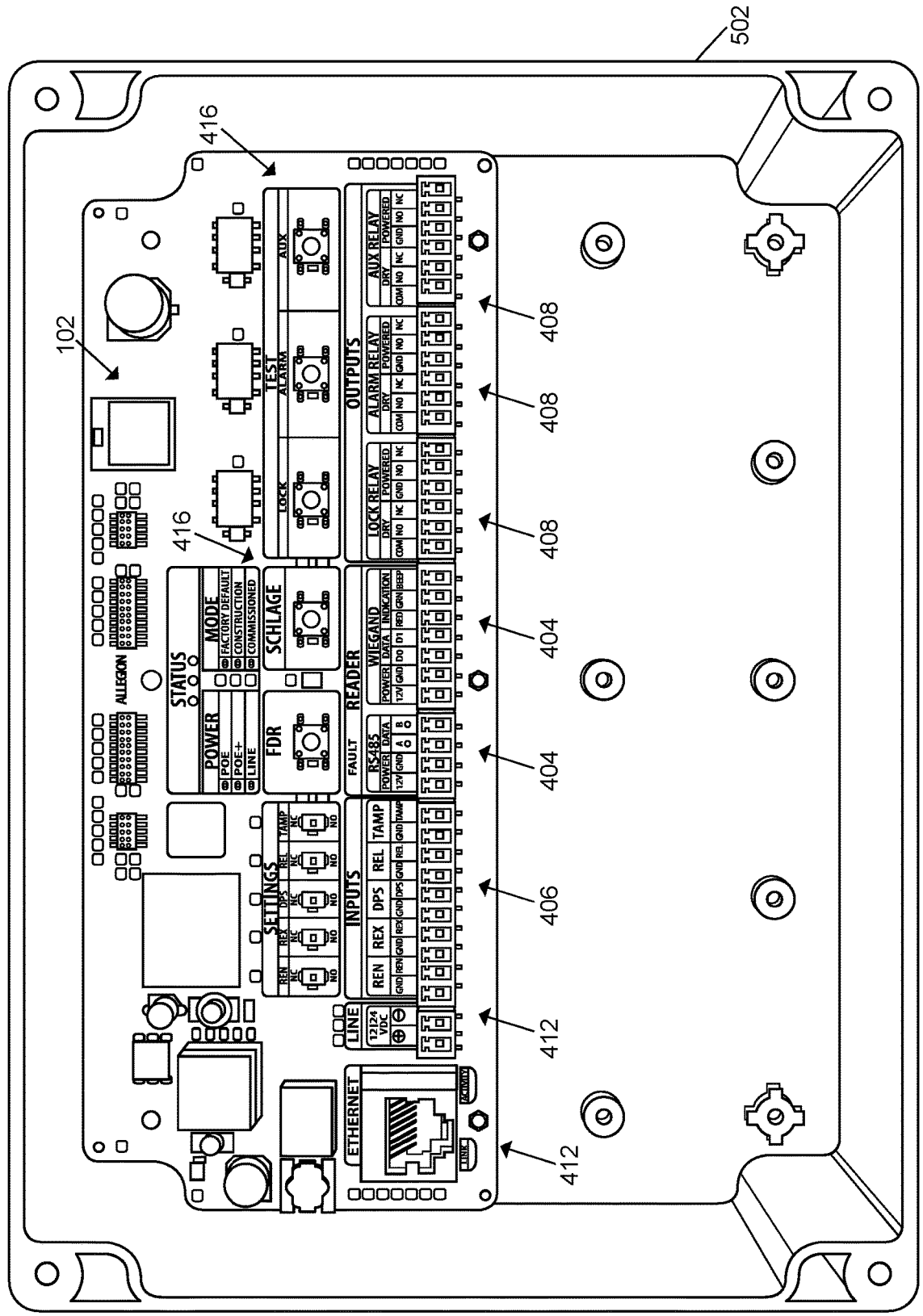
FIG. 5 is a front view of at least one embodiment of a peripheral controller of the access control system of FIG. 1.
Figure 6:
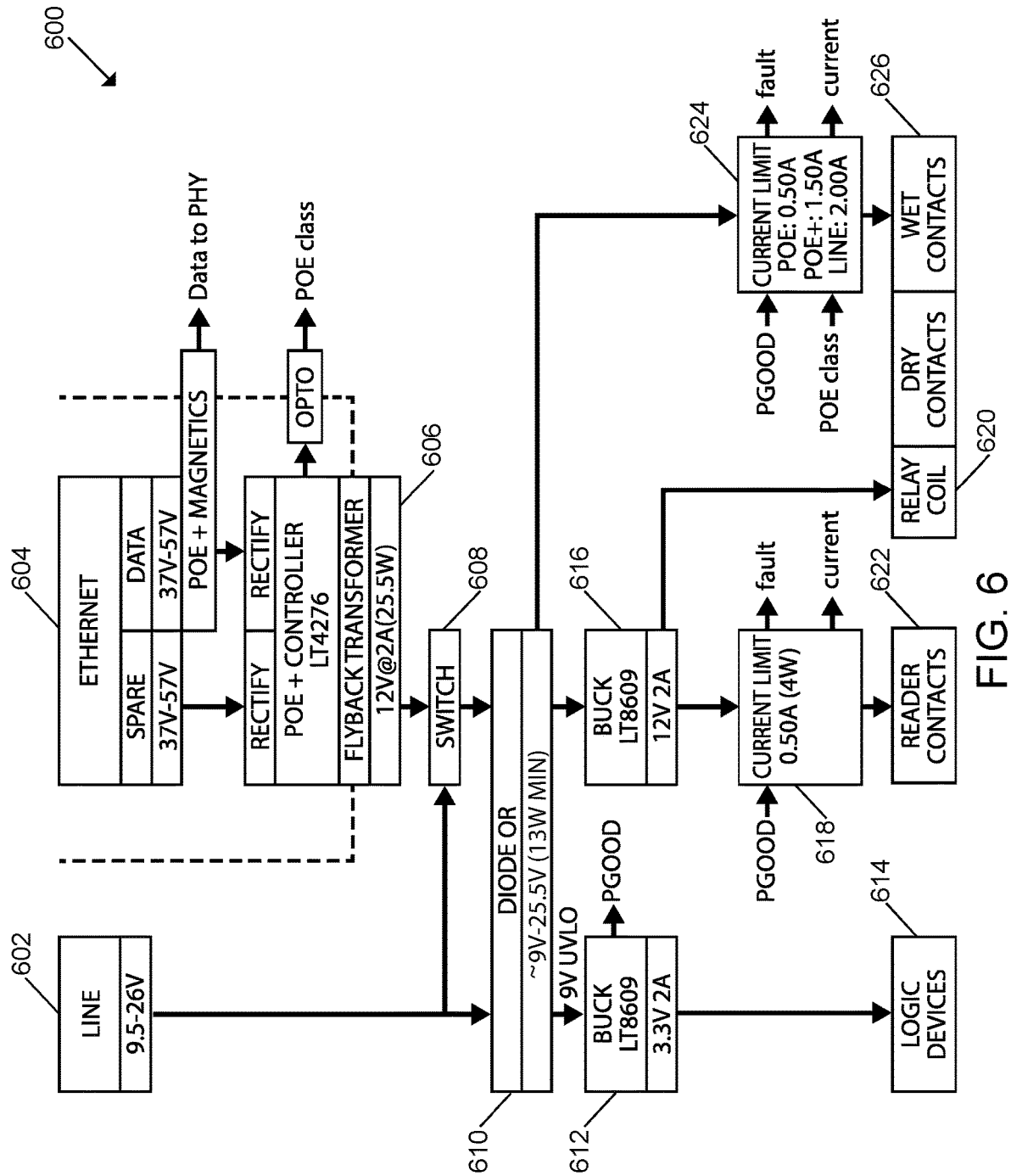
FIG. 6 is a simplified block diagram of at least one embodiment of a power distribution circuit of the peripheral controller of FIG. 1.

It should be appreciated that, in some embodiments, the peripheral controller 102 may include the hardware architecture 400 described in reference to FIG. 4, the peripheral controller 102 may be embodied as the controller 102 described in reference to FIG. 5, and/or the peripheral controller 102 may include the power distribution circuit 600 described in reference to FIG. 6. It should be further appreciated that each of the management server 104, the cloud server(s) 106, the mobile device 108, the mobile device 110, the gateway device 112, the credential enrollment reader 114, the RS-485 reader 116, and/or the Wiegand reader 118 may be embodied as a computing device similar to the computing device 300 described below in reference to FIG. 3. For example, in the illustrative embodiment, each of the management server 104, the cloud server(s) 106, the mobile device 108, the mobile device 110, the gateway device 112, the credential enrollment reader 114, the RS-485 reader 116, and the Wiegand reader 118 includes a processing device 302 and a memory 306 having stored thereon operating logic 308 for execution by the processing device 302 for operation of the corresponding device.

Referring now to FIG. 3, a simplified block diagram of at least one embodiment of a computing device 300 is shown. The illustrative computing device 300 depicts at least one embodiment of a management server, cloud server, mobile device, gateway device, and/or reader device that may be utilized in connection with the management server 104, the cloud server(s) 106, the mobile device 108, the mobile device 110, the gateway device 112, the credential enrollment reader 114, the RS-485 reader 116, and/or the Wiegand reader 118 illustrated in FIG. 1. Depending on the particular embodiment, the computing device 300 may be embodied as a reader device, credential device, access control device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 300 includes a processing device 302 that executes algorithms and/or processes data in accordance with operating logic 308, an input/output device 304 that enables communication between the computing device 300 and one or more external devices 310, and memory 306 which stores, for example, data received from the external device 310 via the input/output device 304.

The input/output device 304 allows the computing device 300 to communicate with the external device 310. For example, the input/output device 304 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, BLE, Wi-Fi®, WiMAX, CDMA, LTE, GSM, IP, etc.) to effect such communication depending on the particular computing device 300. The input/output device 304 may include hardware, software, and/or firmware suitable for performing the techniques described herein.

The external device 310 may be any type of device that allows data to be inputted or outputted from the computing device 300. For example, in various embodiments, the external device 310 may be embodied as the management server 104, the cloud server(s) 106, the mobile device 108, the mobile device 110, the gateway device 112, the credential enrollment reader 114, the RS-485 reader 116, and/or the Wiegand reader 118. Further, in some embodiments, the external device 310 may be embodied as another computing device, sensor, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 310 may be integrated into the computing device 300.

The processing device 302 may be embodied as any type of processor(s) capable of performing the functions described herein. In particular, the processing device 302 may be embodied as one or more single or multi-core processors, microcontrollers, or other processor or processing/controlling circuits. For example, in some embodiments, the processing device 302 may include or be embodied as an arithmetic logic unit (ALU), central processing unit (CPU), digital signal processor (DSP), and/or another suitable processor(s). The processing device 302 may be a programmable type, a dedicated hardwired state machine, or a combination thereof. Processing devices 302 with multiple processing units may utilize distributed, pipelined, and/or parallel processing in various embodiments. Further, the processing device 302 may be dedicated to performance of just the operations described herein, or may be utilized in one or more additional applications. In the illustrative embodiment, the processing device 302 is of a programmable variety that executes algorithms and/or processes data in accordance with operating logic 308 as defined by programming instructions (such as software or firmware) stored in memory 306. Additionally or alternatively, the operating logic 308 for processing device 302 may be at least partially defined by hardwired logic or other hardware. Further, the processing device 302 may include one or more components of any type suitable to process the signals received from input/output device 304 or from other components or devices and to provide desired output signals. Such components may include digital circuitry, analog circuitry, or a combination thereof.

The memory 306 may be of one or more types of non-transitory computer-readable media, such as a solid-state memory, electromagnetic memory, optical memory, or a combination thereof. Furthermore, the memory 306 may be volatile and/or nonvolatile and, in some embodiments, some or all of the memory 306 may be of a portable variety, such as a disk, tape, memory stick, cartridge, and/or other suitable portable memory. In operation, the memory 306 may store various data and software used during operation of the computing device 300 such as operating systems, applications, programs, libraries, and drivers. It should be appreciated that the memory 306 may store data that is manipulated by the operating logic 308 of processing device 302, such as, for example, data representative of signals received from and/or sent to the input/output device 304 in addition to or in lieu of storing programming instructions defining operating logic 308. As shown in FIG. 3, the memory 306 may be included with the processing device 302 and/or coupled to the processing device 302 depending on the particular embodiment. For example, in some embodiments, the processing device 302, the memory 306, and/or other components of the computing device 300 may form a portion of a system-on-a-chip (SoC) and be incorporated on a single integrated circuit chip.

In some embodiments, various components of the computing device 300 (e.g., the processing device 302 and the memory 306) may be communicatively coupled via an input/output subsystem, which may be embodied as circuitry and/or components to facilitate input/output operations with the processing device 302, the memory 306, and other components of the computing device 300. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 300 may include other or additional components, such as those commonly found in a typical computing device (e.g., various input/output devices and/or other components), in other embodiments. It should be further appreciated that one or more of the components of the computing device 300 described herein may be distributed across multiple computing devices. In other words, the techniques described herein may be employed by a computing system that includes one or more computing devices. Additionally, although only a single processing device 302, I/O device 304, and memory 306 are illustratively shown in FIG. 3, it should be appreciated that a particular computing device 300 may include multiple processing devices 302, I/O devices 304, and/or memories 306 in other embodiments. Further, in some embodiments, more than one external device 310 may be in communication with the computing device 300.

FIG. 4 depicts a hardware architecture 400 of an illustrative embodiment of the peripheral controller 102. As shown, the illustrative hardware architecture 400 includes a microprocessor or microcontroller 402, a reader interface 404, a set of inputs 406, a set of output relays 408, a power block or power circuitry 410, a power interface 412, a wireless communication circuitry 414, one or more buttons 416, one or more LEDs 418, one or more cryptography integrated circuits 420, an enclosure tamper, and other components as shown. It should be appreciated that the peripheral controller 102 of FIG. 1 may include additional and/or alternative components to the components depicted in the hardware architecture 400 in some embodiments. Similarly, in some embodiments, one or more components of the hardware architecture 400 may be omitted from the peripheral controller 102. FIG. 5 depicts at least one embodiment of the peripheral controller 102, which includes the various components of the hardware architecture 400. As shown, the illustrative peripheral controller 102 of FIG. 5 is secured to and/or positioned within a housing 502 or enclosure.

It should be appreciated that the microcontroller 402 may be embodied as any type of microcontroller 402 suitable for performing the functions described herein. For example, in some embodiments, the microcontroller 402 may be similar to the processing device 302 of FIG. 3, the description of which is provided above and not repeated herein for clarity of the description.

The illustrative reader interface 404 includes one or more reader status LEDs, an RS-485 interface (e.g., OSPD secure), a power interface (e.g., for 12 VDC power), a Wiegand interface, and Wiegand control lines. As such, it should be appreciated that the reader interface 404 may be configured to support multiple communication formats in some embodiments. In particular, in the illustrative embodiment, the reader interface 404 supports RS-485 readers 116 and Wiegand readers 118; however, in some embodiments, only one of those readers may be supported at a given time, which may be hardware-selectable, for example, via a button/switch). In some embodiments, the RS-485 interface may also be used to re-flash an RS-485 reader 116 coupled to the peripheral controller 102. Further, in some embodiments, with respect to the Wiegand interface and control lines, the reader interface 404 may only support D1 and D0 communication with control lines for LEDs (e.g., red and green) and a beeper. It should be appreciated that the reader interface 404 may support additional and/or alternative readers in other embodiments. Similarly, in some embodiments, one or more components of the reader interface 404 may be omitted from the peripheral controller 102.

The illustrative inputs 406 include one or more dip switch inputs, one or more input status LEDs, a reader tamper input, a request to exit (REX) input, a request to enter (REN) input, a remote release (REL) input, and a door position switch (DPS) input. Each of the inputs 406 may be wired or otherwise electrically coupled to a corresponding component or device. For example, the reader tamper input may be wired to a reader in use (e.g., the RS-485 reader 116 or the Wiegand reader 118). In some embodiments, the REN input (e.g., providing a REN status) may be supported via IP and/or Ethernet. In some embodiments, the REX input prevents forced door status states from triggering when the door is opened from the inside. Further, the REX input may also trigger the peripheral controller 102 (e.g., via the microcontroller 402) to unlock a locking relay (e.g., dry/wet strike) to ensure the user is allowed free egress. When the peripheral controller 102 is in an online mode, the REX status may be transmitted to the management server 104 directly via an Ethernet connection or via the gateway device 112 depending on the particular embodiment. The DPS senses the state of the door or other associated barrier. As shown in reference to FIG. 5, one or more of the inputs 406 (e.g., REN, REX, DPS, REL, TAMP) may be associated with a dip switch (or other switch) to allow the user to configure the hardware architecture 400 and, more specifically, configure the manner each input/switch works (e.g., normally open or normally closed). Further, the input status LEDs associated with each of those inputs 406 may turn on when the switch is activated, which allows the installer to verify that the setup is correct without having access to a mobile application or ancillary device. It should be appreciated that the peripheral controller 102 may include additional and/or alternative inputs 406 in other embodiments. Similarly, in some embodiments, one or more of the inputs 406 may be omitted from the peripheral controller 102.

The illustrative power interface 412 includes an interface for line power from an external power supply (e.g., 12/24 VDC input) and an Ethernet interface for receiving Ethernet data communication and PoE from a router, switch, or other suitable device. For example, the Ethernet interface may support PoE IEEE 802.3af (up to 15.4 W) and/or PoE+ IEEE 802.3at (up to 25.5 W). In some embodiments, the power interface 412 only permits one power source to be used at a given time. For example, the power interface 412 may default to line power if both PoE and line power are connected to the peripheral controller 102. In other embodiments, it should be appreciated that the peripheral controller 102 may be, additionally or alternatively, be powered via a battery or other independent power source.

The illustrative power circuitry 410 is configured to convert power received from the power interface 412 from the power supply into power usable by the peripheral controller 102. For example, in the illustrative embodiment, the power circuitry 410 is configured to convert the supplied power into 12V power (e.g., for the reader), 3.3V power (e.g., for other circuit components), and/or wet power (e.g., to power the wet strike, wet auxiliary, and/or wet alarm components via the relays 408). Further, the power circuitry 410 may handle the PoE power and include power LEDs and suitable power storage (e.g., an RTC supercapacitor).

In the illustrative embodiment, it should be appreciated that the peripheral controller 102 is configured to provide power to the corresponding reader (e.g., 12 VDC at up to 0.5 A). If more than the maximum power is drawn, a reader fault may be generated (e.g., via triggering an e-Fuse) to limit/cut power to the reader and prevent "browning out" of the peripheral controller 102. The peripheral controller 102 may also measure the current that the reader is drawing via an ADC port to the microcontroller 402. It should further be appreciated that, in some embodiments, the strike/lock, alarm, and auxiliary powered relays 408 may be designed to have different available output current depending on the input power source. For example, the output current for PoE may be up to 0.5 A at 12 VDC, the output current for PoE+ may be up to 1.5 A at 12 VDC, and the output current for line power may be up to 2.0 A at line power input voltage of 12 or 24 VDC. The current ratings and e-Fuse fault may be shared for the three power relays. Additionally, the peripheral controller 102 may also measure the current that the relays are drawing via a port to the microcontroller 402.

It should be appreciated that the peripheral controller 102 may include a power distribution circuit similar to the power distribution circuit 600 of FIG. 6. As shown and described herein, the power distribution circuit 600 may receive power from line power 602 or via an Ethernet connection 604 (i.e., via PoE). If power is received from PoE (e.g., 37V-57V), the power signal may be analyzed by the physical layer (PHY) components of the hardware architecture 400 and/or an Ethernet microprocessor/microcontroller to process the transmitted data. Further, in some embodiments, the data may be processed by a corresponding cryptography integrated circuit 420 as shown in FIG. 4. Further, the received power signal may be rectified, managed by a PoE+ controller (e.g., an LT4276 PoE+ controller IC available from Analog Devices, formerly Linear Technology), adapted by a flyback transformer 606, and transmitted to a switch 608 (e.g., as 12V at 2 A (25.5 W). If the power is received from line power 602 (e.g., at 9.5V-26V), the power signal is also transmitted to the switch 608.

Whether received directly from line power 602 or the flyback transformer 606, the switch 608 transmits the associated power signal to the diode circuit 610 (e.g., rectifier diodes). Additionally, the original line power 602 signal is also transmitted directly to the diode circuit 610 when line power 602 is used. In the illustrative embodiment, the diode circuit 610 has approximately 9V-25.5V output with a 13 W minimum. The illustrative diode circuit 610 is electrically coupled to a buck converter 612 (e.g., an LT8609 Synchronous Step-Down Regulator available from Linear Technology) that generates a 3.3V, 2 A power signal for powering one or more logic devices 614. The illustrative diode circuit 610 is also electrically coupled to another buck converter 616 (e.g., an LT8609 Synchronous Step-Down Regulator available from Linear Technology) that generates a 12V, 2 A power signal, which is transmitted to a current limiter 618 and a relay coil 620. The illustrative current limiter 618 generates faults as appropriate and supplies the required power to the reader contacts 622. In the illustrative embodiment, the diode circuit 610 also transmits the output power signal to a current limiter 624, which generates faults as appropriate and supplies the required power to the contacts 626. It should be appreciated that, in some embodiments, the peripheral controller 102 may include a power distribution circuit different from the power distribution circuit 600 of FIG. 6.

Referring back to FIG. 4, as indicated above, the peripheral controller 102 may include one or more cryptography integrated circuits 420 in some embodiments. For example, in some embodiments, the peripheral controller 102 may include a cryptography integrated circuit 420 that is coupled to an Ethernet microcontroller/microprocessor (e.g., via an I2C connection). Additionally or alternatively, in some embodiments, a different cryptography integrated circuit 420 may be coupled to the microcontroller 402 (e.g., via an I2C connection). In some embodiments, the cryptography integrated circuit 420 may be dedicated to performing encryption, decryption, and other cryptographic functions.

The illustrative buttons 416 include a factory default reset (FDR) button, a Schlage® button, and three test buttons (lock test, alarm test, and auxiliary test). It should be appreciated that the FDR and/or Schlage® buttons may be configured to put the peripheral controller 102 into various modes. In some embodiments, such modes include an FDR mode, a safe mode (FFR), a start BLE advertising mode, an initiate construction mode, and a disconnect BLE from the gateway mode. Further, the test buttons may be used by installers to test the output relays 408 without involving a mobile application or other device during setup. In some embodiments, the test buttons may have a hardware XOR gate that reverses the state of the corresponding output relay 408 regardless of the state of the microcontroller 402. For example, the state of a relay may be indicated by a corresponding output status LED. It should be appreciated that the peripheral controller 102 may include additional and/or alternative buttons 416 in other embodiments. Similarly, in some embodiments, one or more of the buttons 416 may be omitted from the peripheral controller 102.

As described above, the peripheral controller 102 may be configured to wirelessly communicate with various devices of the access control system 100 depending on the particular embodiment. As such, the illustrative wireless communication circuitry 414 includes a Bluetooth (e.g., BLE) communication circuitry (e.g., for communication with the mobile devices 108, 110 and/or the gateway device 112) and a Wi-Fi communication circuitry (e.g., for communication via a Wi-Fi router). As described herein, the Wi-Fi communication circuitry (e.g., Wi-Fi module) may connect the mobile device 108, 110 to the local network allowing the user to update the peripheral controller 102 remotely. In various embodiments, the updates may include lock firmware updates, adding/deleting users from the lock, and/or other suitable updates. In some embodiments, when the peripheral controller 102 contacts the management server 104 and/or cloud server 106, the server 104, 106 provides the peripheral controller 102 with the next time to contact the server 104, 106 for updates. In some embodiments, the peripheral controller 102 supports PEAPv0, WPA2, and/or WEP Wi-Fi protocols. It should be appreciated that the peripheral controller 102 may be configured to wirelessly communicate using different technologies in other embodiments.

The illustrative output relays 408 include a dry strike relay, a dry auxiliary relay, a dry alarm relay, a wet (powered) strike relay, a wet (powered) auxiliary relay, and a wet (powered) alarm relay. Further, those output relays 408 are associated with corresponding output test buttons 416 and output status LEDs as described above. In the illustrative embodiment, the output relays 408 are embodied as mechanical relays. However, it should be appreciated that the output relays 408 may be embodied as solid state relays and/or other types of relays in other embodiments. It should be appreciated that the peripheral controller 102 may include additional and/or alternative relays 408 in other embodiments. Similarly, in some embodiments, one or more of the relays 408 may be omitted from the peripheral controller 102.

What is claimed is:

1. An access control system, comprising:
    a credential reader configured to receive access credentials via a wireless communication connection with a credential device;
    an electronic lock including a lock mechanism configured to control access through a barrier; and
    a peripheral controller separate from the electronic lock, separate from the credential reader, and comprising a reader interface communicatively coupled to the credential reader, a Power over Ethernet (PoE) circuit that receives power over an Ethernet cable for powering the peripheral controller, a plurality of output relays, and a plurality of test buttons, wherein each test button of the plurality of test buttons corresponds with an output relay of the plurality of output relays and is configured to directly test the corresponding output relay, and wherein the peripheral controller is configured to:
        analyze credential data received from the credential device via the reader interface;
        make an access control decision based on the analyzed credential data to determine whether to grant access to a user of the credential device; and
        transmit a control signal to the electronic lock to unlock the lock mechanism in response to a determination to grant access to the user.

2. The access control system of claim 1, wherein the plurality of output relays of the peripheral controller comprises a first output relay electrically coupled to the lock mechanism;
    wherein to transmit the control signal to the electronic lock comprises to transmit the control signal to the first output relay and to transmit a corresponding signal to the lock mechanism to cause the lock mechanism to unlock.

3. The access control system of claim 2, wherein the lock mechanism comprises an electrical door strike.

4. The access control system of claim 1, wherein the peripheral controller further comprises a line power interface configured to receive line power from an external power supply and an Ethernet interface configured to receive Ethernet data communication and Power-over-Ethernet (PoE) from a remote device.

5. The access control system of claim 1, further comprising a management server configured to communicate with the peripheral controller via at least one of a Bluetooth connection, a Wi-Fi connection, or an Ethernet connection to exchange at least one of a firmware update, audit data, access control database data, or an access control schedule.

6. The access control system of claim 1, further comprising a mobile device configured to communicate with the peripheral controller via a Bluetooth connection and a Wi-Fi connection; and
    wherein the Bluetooth connection or the Wi-Fi connection is selected based on a file size of data to be exchanged between the peripheral controller and the mobile device.

7. The access control system of claim 1, wherein the peripheral controller further comprises:
    a plurality of inputs electrically coupled to corresponding input components of the peripheral controller, and
    a plurality of user-configurable switches, wherein each input of the plurality of inputs is user-configurable by a user during operation of the peripheral controller as normally open or normally closed based on a corresponding switch of the plurality of switches.

8. A peripheral controller for an access control system, the peripheral controller comprising:
    a reader interface configured to be communicatively coupled to at least one credential reader separate from the peripheral controller;
    a Power over Ethernet (PoE) circuit configured to receive power over an Ethernet cable for powering the peripheral controller;
    a plurality of output relays;
    a plurality of test buttons, wherein each test button of the plurality of test buttons corresponds with an output relay of the plurality of output relays and is configured to directly test the corresponding output relay;
    a processor; and
    a memory comprising a plurality of instructions stored thereon that, in response to execution by the processor, causes the peripheral controller to (i) analyze credential data received via the reader interface and (ii) make an access control decision based on the analyzed credential data.

9. The peripheral controller of claim 8, wherein the plurality of instructions further causes the peripheral controller to transmit a control signal associated with unlocking a lock mechanism that secures a barrier.

10. The peripheral controller of claim 9, wherein the plurality of output relays comprises a first output relay electrically coupled to the lock mechanism;
    wherein to transmit the control signal comprises to transmit a control signal to the first output relay; and
    wherein the first output relay transmits a corresponding signal to the lock mechanism to cause the lock mechanism to unlock.

11. The peripheral controller of claim 10, wherein the lock mechanism comprises an electrical door strike.

12. The peripheral controller of claim 8, further comprising:
    a line power interface configured to receive line power from an external power supply; and
    an Ethernet interface configured to receive Ethernet data communication and Power-over-Ethernet (PoE) from a remote device.

13. The peripheral controller of claim 8, further comprising communication circuitry configured to facilitate communication with a management server via at least one of a Bluetooth connection, a Wi-Fi connection, or an Ethernet connection; and
    wherein the plurality of instructions further causes the peripheral controller to communicate with the management server via the communication circuitry to exchange at least one of a firmware update, audit data, access control database data, or an access control schedule.

14. The peripheral controller of claim 8, wherein the reader interface supports communication with each of the at least one credential reader via one of an RS-485 interface and a Wiegand interface and control lines at a given time.

15. The peripheral controller of claim 14, further comprising a hardware selector to select between the RS-485 interface and the Wiegand interface.

16. The peripheral controller of claim 8, further comprising wireless communication circuitry configured to facilitate communication with a mobile device via a Bluetooth connection and a Wi-Fi connection; and wherein the plurality of instructions further causes the peripheral controller to communicate with the mobile device via one of the Bluetooth connection or the Wi-Fi connection selected based on a file size of data to be exchanged between the peripheral controller and the mobile device.

17. The peripheral controller of claim 8, wherein the plurality of test buttons comprises a lock test button, an alarm test button, and an auxiliary test button.

18. The peripheral controller of claim 8, further comprising:

a plurality of output status LEDs, wherein each output status LED of the plurality of output status LEDs corresponds with an output relay of the plurality of output relays and is configured to indicate a status the corresponding output relay; and wherein the output status LED of a corresponding output relay is changed by activation of the test button associated with corresponding output relay.

19. The peripheral controller of claim 8, further comprising:

a plurality of inputs electrically coupled to corresponding input components of the peripheral controller; and a plurality of user-configurable switches, wherein each input of the plurality of inputs is user-configurable by a user of the peripheral controller as normally open or normally closed based on a corresponding switch of the plurality of switches.

20. The peripheral controller of claim 8, further comprising a plurality of inputs including a request to exit (REX) input, a request to enter (REN) input, a remote release (REL) input, and a door position switch (DPS) input electrically coupled to corresponding input components.

* * * * *